United States Patent
Slabinski (10) Patent No.: US 6,374,124 B1
(45) Date of Patent: *Apr. 16, 2002

(54) DYNAMIC REALLOCATION OF TRANSCEIVERS USED TO INTERCONNECT WIRELESS TELEPHONES TO A BROADBAND NETWORK

(75) Inventor: Richard P. Slabinski, Temple, NH (US)

(73) Assignee: Transcept, Inc., Manchester, NH (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/998,301

(22) Filed: Dec. 24, 1997

(51) Int. Cl.[7] .................................................. H04B 1/38
(52) U.S. Cl. ........................ 455/562; 455/453; 455/3.03
(58) Field of Search ................................. 455/561, 562, 455/560, 452, 453, 524, 525, 3.1, 5.1

(56) References Cited

U.S. PATENT DOCUMENTS

| | | |
|---|---|---|
| 4,144,411 A | 3/1979 | Frenkiel |
| 4,392,245 A | 7/1983 | Mitama |
| 4,882,765 A | 11/1989 | Maxwell |
| 4,914,715 A | 4/1990 | Miyata |
| 5,067,173 A | 11/1991 | Gordon et al. |
| 5,129,098 A | 7/1992 | McGirr et al. |
| 5,193,223 A | 3/1993 | Walczak et al. |
| 5,303,287 A | 4/1994 | Laborde |
| 5,321,736 A | 6/1994 | Beasley |
| 5,327,144 A | 7/1994 | Stilp et al. |
| 5,343,493 A | 8/1994 | Karimullah |
| 5,381,459 A | 1/1995 | Lappington |
| 5,396,484 A | 3/1995 | Itoh |
| 5,416,802 A | 5/1995 | Ishii |
| 5,452,473 A | 9/1995 | Weiland et al. |
| 5,513,176 A | 4/1996 | Dean et al. |
| 5,515,014 A | 5/1996 | Troutman |
| 5,590,173 A | 12/1996 | Beasley |
| 5,732,353 A * | 3/1998 | Haartsen ...................... 455/450 |
| 5,768,279 A | 6/1998 | Barn et al. |
| 5,774,808 A * | 6/1998 | Sarkioja et al. ............. 455/436 |
| 5,781,541 A | 7/1998 | Schneider |
| 5,781,859 A | 7/1998 | Beasley |
| 5,802,173 A | 9/1998 | Hamilton-Piercy et al. |
| 5,805,983 A * | 9/1998 | Naidu et al. ................ 455/67.4 |
| 5,809,395 A | 9/1998 | Hamilton-Piercy et al. |
| 5,822,324 A | 10/1998 | Kostresti et al. |
| 5,825,762 A * | 10/1998 | Kamin, Jr. et al. ......... 370/335 |
| 5,831,976 A * | 11/1998 | Lin et al. ..................... 370/329 |
| 6,122,529 A * | 9/2000 | Sabat, Jr. et al. ............ 455/561 |
| 6,192,216 B1 * | 2/2001 | Sabat, Jr. et al. ............ 455/5.1 |
| 6,223,021 B1 * | 4/2001 | Silvia et al. ..................... 45/77 |

FOREIGN PATENT DOCUMENTS

| | | | | |
|---|---|---|---|---|
| EP | 526285 | * | 3/1993 | ............ H04Q/1/02 |
| GB | 2253770 A | | 9/1992 | |
| GB | 2289198 A | | 11/1995 | |
| WO | WO 97/13386 | * | 4/1997 | ............ H04Q/7/36 |
| WO | WO 97/29608 | * | 8/1997 | ............ H04Q/7/36 |

* cited by examiner

Primary Examiner—William Trost
Assistant Examiner—Tilahun Gesesse
(74) Attorney, Agent, or Firm—Kirkpatrick & Lockhart LLP (57) ABSTRACT

In a wireless telephone system that utilizes a plurality of remote transceivers to carry telephony signals between wireless telephones in a primary area and a central transceiver via a broadband distribution network, circuitry is disclosed to change the operational parameters of ones of the remote transceivers to reallocate them to handle wireless telephone traffic in an alternate area when there is an increased number of wireless telephone calls in the alternate area.

8 Claims, 4 Drawing Sheets

DYNAMIC REALLOCATION OF TRANSCEIVERS USED TO INTERCONNECT WIRELESS TELEPHONES TO A BROADBAND NETWORK

FIELD OF THE INVENTION

The present invention relates to wireless communications systems, and more particularly to apparatus and a method for dynamically reallocating central resources and remote transceivers to better handle peak traffic loads in a wireless telephone system where the remote transceivers carry telephony signals between wireless telephones and a central transceiver via a broadband distribution network.

BACKGROUND OF THE INVENTION

The prior art teaches the use of existing cable television network cables to carry telephony signals between a telephone network and remote transceiver sites in defined cells or sectors. The transceivers are used to establish wireless telephony communication links with wireless telephones that are operating within an area covered by each remote transceiver. To increase the number of wireless telephone subscribers that can use the wireless telephone system it has been suggested to decrease the size and operational range of each cell or sector, and to increase the number of cells or sectors required to provide wireless telephone service to a given area. Having cells or sectors of decreased size permits greater reuse of the limited number of frequency channels allocated for wireless telephone service because other cells or sectors located at a closer range can reuse the same frequency channels for additional calls without signal interference. The advantages of reducing cell or sector size to increase the call carrying capacity of the wireless telephone network is offset by the requirement for additional remote transceivers for the additional cells. This offset is minimized by utilizing an existing broadband distribution network to provide the communications path between remote transceivers in each of the cells or sectors and a central transceiver. The base transceiver station acts as the interface between the telephone network and the wireless telephone system, and the central transceiver acts as the wireless telephone system interface with the broadband distribution network.

To carry wireless telephony signals over a broadband distribution network, as described above, a predetermined bandwidth on the network is typically allocated for this purpose. However, as required, more bandwidth may be allocated to carry wireless telephony signals. To most efficiently use a given bandwidth to carry wireless telephony signals between wireless telephones and the telephone network, a combination of frequency and time division multiplexing is utilized. This requires base transceiver station equipment that acts as the interface with the telephone network and the wireless telephone system. With the base transceiver station equipment is a central transceiver RASP), also called a Headend Interface Converter (HIC), that interfaces with the broadband distribution network, and it must function with telephony signals in the wide frequency spectrum of radio frequency signals on the telephone network, and up to 1000 Mhz over the broadband distribution network. This system also requires a plurality of remote transceivers, also called cable microcell integrators (CMI) or Remote Antenna Drivers (RADs), in each of the cells or sectors that can carry many channels of telephony signals between the wireless telephones and the central transceiver via the broadband distribution network, without creating signal interference with the telephony signals in adjacent cells or sectors. In addition, the remote transceivers (RADs) must function with and translate telephony signals in the wide frequency spectrums of up to 1000 Mhz on the broadband distribution network and between 1850–1990 MHz for the radio link between remote transceivers and wireless telephones.

The number of remote transceivers assigned to handle wireless telephone traffic in any given area depends on the normal level of telephone traffic experienced in the area. However, when normal traffic levels are exceeded some wireless telephone users experience busy indications and must wait to make a call.

SUMMARY OF THE INVENTION

Thus, there is a need in the art for a small, relatively inexpensive, remotely located transceiver that can be used in quantity in a wireless telephone system to carry telephony signals between wireless telephones and a central transceiver via a broadband distribution network, where operational parameters of the remote transceivers may be re-assigned to handle additional telephony traffic during peak traffic periods.

The above described need in the wireless telephone system prior art is satisfied by the present invention. A small, relatively inexpensive, remote transceiver is provided which is used in a wireless telephone system as briefly described above. These remote transceivers carry wireless telephone signals over a broadband distribution network, such as HFC, fiber optic cable, or coaxial cable, on which the transceivers are hung and to which they are connected, thus eliminating the need for antenna towers. Each remote transceiver is assigned to normally handle wireless telephone traffic in a small surrounding area, but the operational parameters of the remote transceivers can be dynamically changed from a central location so that each remote transceiver may be re-assigned to handle wireless telephony traffic from an adjacent area during peak traffic periods.

DESCRIPTION OF THE DRAWING

The invention will be better understood upon reading the following Detailed Description in conjunction with the drawing in which.

DETAILED DESCRIPTION

In the drawing and the following detailed description, all elements are assigned three digit reference numbers. The first digit of each reference number indicates in which figure of the drawing an element is located. The second and third digits of each reference number indicate specific elements.

If the same element appears in more than one figure of the drawing, the second and third digits remain the same and only the first digit changes to indicate the figure of the drawing in which the element is located As used herein the term "telephony signals" includes voice, data, fax and any other types of signals that are sent over a telephone network now or in the future. Throughout the Figures and the following description, reference is made, for one example, to a combined band pass filter and amplifier 325a. There are a number of other such combined band pass filters and amplifiers. They are shown and referenced this way for ease of presentation only. In reality they are each a discrete, separate filter the output of which is input to an amplifier.

Figure 1:
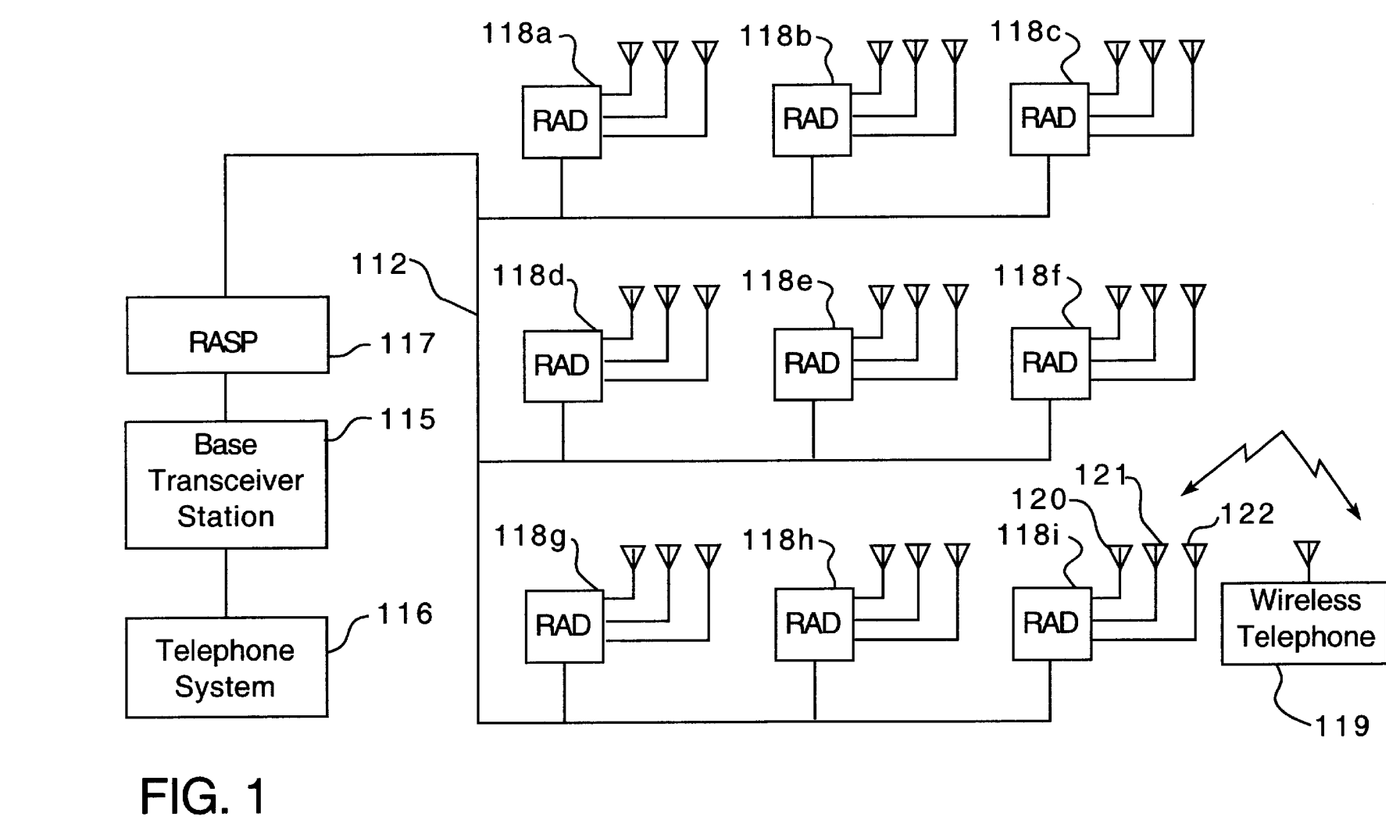
FIG. 1 is a block diagram of a wireless telephony system integrated with a broadband distribution network.

In FIG. 1 is shown a simple block diagram of an exemplary broadband distribution network integrated with elements of a wireless telephone system which include a plurality of remote transceivers known as Remote Antenna Drivers (RAD) 118. There are different types of broadband distribution networks in use, and such networks may utilize coaxial cable, fiber optic cable, microwave links, or combinations of these. The broadband distribution network disclosed herein is a conventional hybrid fiber coaxial (HFC) cable to which a plurality of RADs 118 are connected to. Electrical power is distributed along broadband distribution network 112 to power line amplifiers (not shown) of the broadband distribution network. This electrical power source, or alternate power sources, are used to provide power to RADs 118a–i.

Integrated with broadband distribution network 112 is a wireless telephony system in which the present invention is utilized. One such wireless telephony system is taught in U.S. patent application Ser. No. 08/695,175, filed Aug. 1, 1996, and entitled "Apparatus And Method For Distributing Wireless Communications Signals To Remote Cellular Antennas". The telephony system disclosed herein includes a Base Transceiver Station (BTS) 115 which is connected to a telephone system 116. Base transceiver station 115 is also connected to a Remote Antenna Signal Processor (RASP) 117 which is the interface to a broadband distribution network 112. Telephony signals and control signals to be sent between telephone system 116 and wireless telephones 119 are carried via broadband network 112 using RASP 117 and Remote Antenna Drivers (RAD) 118.

As is known in the prior art, including the above cited prior patent application, one or more frequency bands or channels of the broadband distribution network 112 are reserved to carry telephony signals between telephone system 116 and wireless telephones 119. Telephony signals originating from telephone system 116 are transmitted by RASP 117, in frequency division multiplexing format, via broadband network 112 to a plurality of remote antenna drivers (RAD) 118 which are connected to broadband network 112. Telephony signals originating at wireless telephones 119 are frequency multiplexed together by RADs 118 and transmitted along with control signals via broadband network 112 to RASP 117, and thence to base transceiver station 115 and telephone system 116.

In base transceiver station 115 there are a plurality of transceiver modules (not shown), as is known in the wireless telephony art, each of which operates at a single channel frequency at a time, and which can handle a predetermined maximum number of telephone calls from wireless telephones. In the wireless telephone system described and claimed herein, the frequency that the RADs 118 are assigned to operate at must correspond to the operating frequency of the assigned BTS transceiver module. If a particular RAD 118 is re-assigned to function with a different transceiver module within base transceiver station 115, circuit settings within the particular RAD 118 must be changed to function with the different transceiver module. In the wireless telephony art, transceiver modules in base transceiver station 115 are also referred to as channel card modules and radio modules.

When wireless telephony traffic in a first sector or cell increases to the point where adequate service is not provided to wireless telephone subscribers in the first sector or cell, like during rush hour traffic on a highway, in accordance with the teaching of the present invention the wireless telephone system may be remotely reconfigured by RASP 117 to reassign one or more RADs 118 from one or more nearby sectors or cells, where those RADs 118 have overlapping signal coverage with the first sector or cell, to handle the excess wireless telephony traffic in the first sector cell.

In FIG. 1 are shown three rows of RADs 118. Typically a number of RADs 118 are spaced along, and connected to, broadband distribution network 112 to provide overlapping signal transmission and reception coverage for the entire wireless telephone system. Some of the RADs 118 are physically located near the boundary between two or more cells or sectors and, depending on the frequency of operation they are set to, can be used to handle wireless telephony traffic in one or more of the sectors or cells. Let us assume that RADs 118g,h,i in the bottom row are physically located along broadband distribution system 112 and are configured to handle wireless telephony traffic in a first sector that includes a highway. During early morning and late afternoon every work day there is rush hour traffic that creates peak wireless telephone traffic that causes unacceptable service delays in the first sector. Let us also assume that the RADs 118d,e,f in the middle row in FIG. 1 are configured and located to handle wireless telephone traffic in a second, adjacent sector but they each have an area of signal operation that overlaps the highway in the first sector.

In accordance with the teaching of the present invention one or more of RADs 118d,e,f may be dynamically reassigned by RASP 117 to the first sector to handle the increased telephony traffic originating from the highway. In addition, as necessary, additional RASP 117 channels may be assigned, and additional modules in base transceiver station 115 may be assigned to handle the excess wireless telephony traffic from the first sector.

To do this RASP 117 sends control signals to the selected remote RADs 118d,e,f which will cause the frequency at which they operate to be changed to match the frequency of RADS 118g,h,i that are normally assigned to handle wireless telephone traffic in the first sector. At the end of the peak traffic period RASP 117 may send control signals to the previously reallocated ones of RADs 118d,e,f to change the frequency at which they operate back to their original settings so they are reassigned to handle wireless telephony traffic in the second sector. However, the re-assignment may be permanent depending on traffic patterns encountered.

Each RAD 118 has antennas 120, 121, 122 used to transmit to and receive signals from remote wireless telephones 119. Antenna 120 is used to transmit telephony signals to wireless telephones 119, while antennas 121 and 122 are used to receive telephony signals from wireless telephones 119. Antenna 121 is called the primary antenna, and antenna 122 is called the diversity antenna. Antennas 121 and 122 are physically spaced and cooperate to minimize signal fading and thereby provide continuous signal reception from wireless telephones 119.

Figure 2:
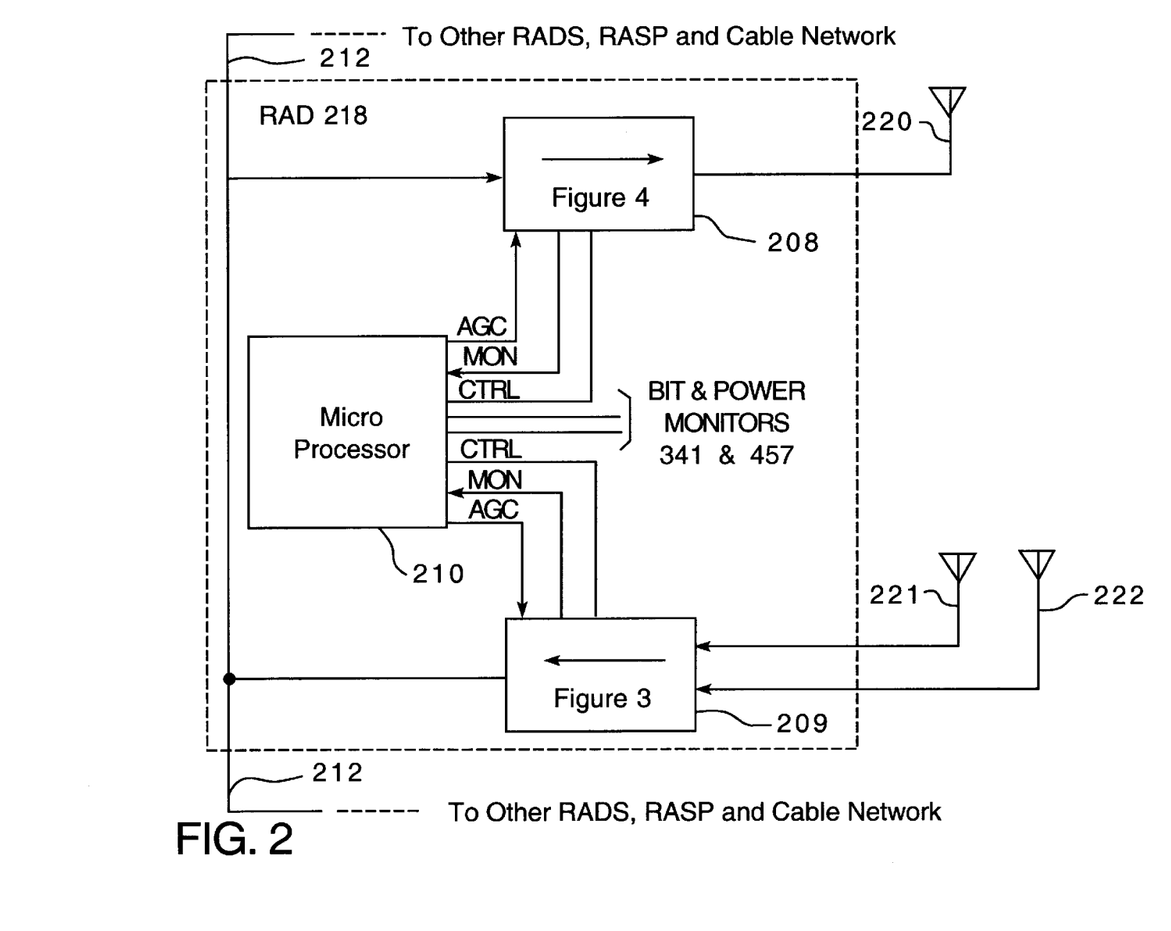
FIG. 2 is a simplified block diagram of a remote transceiver used with the wireless telephony system.

In FIG. 2 is shown a general block diagram of a Remote Antenna Driver (RAD) 218. There is a first circuit 208 of RAD 218, that is shown in detail in FIG. 4, that receives telephony signals originating at telephone system 116 and carried via base transceiver station 115, RASP 117 and broadband network 212 to a RAD 118 which transmits them via antenna 220 to remote wireless telephone 119. There is also a second circuit 209 of RAD 218, that is shown in detail in FIG. 3, that receives telephony signals originating at a wireless telephone 119 via antenna 220, and transmits them via broadband network 212, RASP 117 and Base Transceiver Station (BTS) 115 to Telephone System 116.

Frequency multiplexed with the telephony signals carried between RASP 117 and RAD 218 are signals for interrogating, reporting, and controlling the various circuitry settings in each RAD 218, including changing oscillator frequencies to dynamically re-allocate the assignment of a RAD 218 in accordance with the teaching of the present invention. There are different types of control signals that can be sent from RASP 117 to the RADs 218, and each control signal has an address associated therewith that is recognized by only one RAD 218.

To implement the dynamic re-allocation, RASP 117 sends a control signal to RAD 218 that is received by microprocessor 210 on leads CTRL from circuit 208. This control signal indicates the operation to be performed and indicates the frequencies to which oscillators within this RAD 218 are to be set to re-assign the RAD to handle wireless telephony traffic in an adjacent cell or sector. Microprocessor 210 sends binary control signals to each of the affected oscillators which causes their frequency of operation to change. After this change has been accomplished microprocessor 210 causes a confirmation signal to be returned to RASP 117 indicating that the changes have been accomplished. In addition, at any time RASP 117 may send an interrogation control signal to RAD 218 inquiring as the setting of the oscillators. This operation is described in detail further in this specification with reference to FIGS. 3 and 4.

Figure 3:
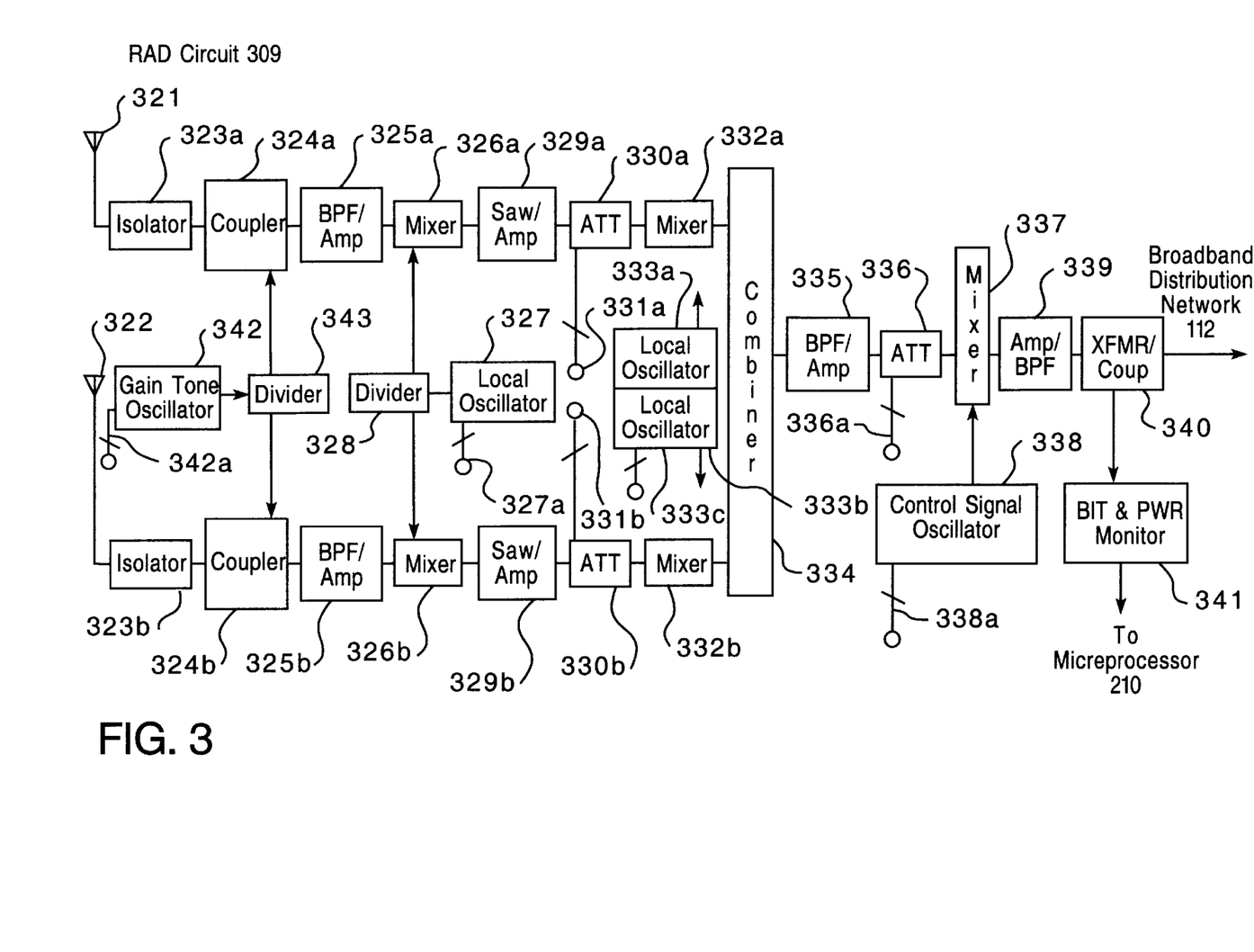
FIG. 3 is a detailed block diagram of the portion of a remote transceiver that transmits telephony communication signals received via a broadband distribution network from the telephone system to wireless telephones, and which can be dynamically reallocated to in accordance with the teaching of the present invention.

In FIG. 3 is shown a detailed block diagram of circuit 309 within Remote Antenna Driver (RAD) 118 (218 in FIG. 2) that carries telephony signals from a wireless telephone 119, via broadband communications network 112, RASP 117 and base transceiver station 115 to telephone system 116. This circuit is also shown as RAD circuit 209 in FIG. 2.

Briefly, primary receive antenna 321 is connected to a first portion of the circuitry in FIG. 3, and that circuitry that is identical to a second portion of the circuitry that is connected to diversity receive antenna 322. The telephony signals received by both antennas 321 and 322 from a wireless telephone 119 (not shown in FIG. 3) are initially processed in parallel, then the two signals are frequency multiplexed together and are both returned via broadband distribution network 112 (shown in FIG. 1) to remote RASP 117 (FIG. 1). This operation is described in the following paragraphs.

Also, built into RAD circuitry 309 in FIG. 3 is circuitry including gain control (AGC) circuitry which is enabled by microprocessor 210 in FIG. 2 responsive to a control signal received from remote RASP 117 to provide end-to-end automatic gain control for the entire system. This AGC operation is described in greater detail hereinafter. Further, RASP 117 can send other frequency multiplexed control signals to each RAD 118, in according with the teaching of the present invention, which microprocessor 210 responds to and changes the frequency at which RAD 118 transmits and receives telephony signals over broadband distribution network 112 to RASP 117, and can also change the frequency at which each RAD 118 communicates with wireless telephones. The wireless telephones operate at one frequency which is received by RAD circuitry 309 and, while being processed therein, the carrier frequency of the telephony signal is heterodyned down to the carrier frequency assigned to this particular RAD in the video channel on broadband network 112 used for wireless telephone communications.

Telephony signals from a wireless telephone 119 (not shown) are received by primary receive antenna 321 of a nearby RAD 118. These signals are input to an isolator 323a which isolates antenna 321 from RAD circuit 309. The telephony signal is then input to directional coupler 324a that has a second signal input thereto from power divider 343 which is used for the aforementioned gain control purposes.

The telephony signal (modulated RF carrier) received from remote wireless telephone 119, and the gain control, low level calibration signal (described below), are applied via directional coupler 324a to a combined band pass filter and amplifier 325a. The signals are amplified and extraneous signals are filtered from the received telephony signal.

The amplified and filtered telephony signal is then input to mixer 326a which is the first of two heterodyning stages used to convert the carrier frequency of the telephony signal to the selected carrier frequency for transmission over broadband distribution network 112 to Remote Antenna Signal Processor (RASP) 117, shown in FIG. 1. Mixer 326a also has input thereto a signal from local oscillator 327. This first heterodyning signal from local oscillator 327 is input to power divider 328 which applies the signal from local oscillator 327 to both mixers 326a and 326b while providing isolation between these two mixers.

The frequency of local oscillator 327 is digitally controlled and is determined by a binary word applied to its control input 327a from microprocessor 210 (FIG. 2), responsive to control signals received from RASP 117. A control signal sent from remote RASP 117 to microprocessor 210 in FIG. 2 causes microprocessor 210 to send the proper binary words to control input 327a of local oscillator 327 to set the frequency of local oscillator 327. Similarly, the control signal from remote RASP 117 causes microprocessor 210 to set the frequency of digitally controlled local oscillators 333a and 333b depending on the carrier frequency chosen to transmit the telephony signal over broadband network 112. As mentioned above, this operation is part of the novel dynamic re-allocation of a RAD 118, 218.

The operation of mixer 326a results in multiple frequencies being output from the mixer as is known in the art. All these signals are input to narrow pass band SAW filter and amplifier 329a which selects only the difference frequency carrier modulated by the telephony signal created by mixer 326a and amplifies same. The signal sent through SAW filter 329a is shifted down in frequency to be closer to the frequency required for transmitting the telephony signal via broadband distribution network 112 to RASP 117.

The frequency shifted carrier modulated by the telephony signal is then input to step attenuator 330a which is used to adjust the gain level of the signal in one-half dB steps. The amount of attenuation provided by step attenuator 330a is controlled by a binary word at its control input 331a from microprocessor 210. The control of step attenuators 330a, 330b, local oscillator 342, and step attenuator 336 is all accomplished responsive to control signals from RASP 117 as part of the gain control that controls the signal level of telephony signals output from RASP 117.

The frequency shifted carrier with telephony signal modulating same that is output from step attenuator 330a is input to mixer 332a along with a fixed frequency signal from local oscillator 333a. Mixer 332a is the second of the aforementioned two heterodyning stages used to convert the telephony signal carrier down to the appropriate frequency for transmission over an assigned channel of broadband distribution network 112 to RASP 117, shown in FIG. 1.

The frequency of oscillator 333a is determined by a binary word applied to its control input 333c. A control signal is sent from RASP 112 which causes microprocessor 210 to set the frequency of local oscillator 333a and local oscillator 333b depending on the carrier frequency chosen to transmit the telephony signal over broadband distribution network 112. The frequency of the signal output from step attenuator 330a is the same as the frequency of the telephony signal output from step attenuator 330b. However, the frequency of local oscillator 333a is different from the frequency of local oscillator 333b. The result is that the carrier frequency of the telephony signal output from mixer 332a is different than the carrier frequency output from mixer 332b. As mentioned above, this operation is part of the novel dynamic re-allocation of a RAD 118, 218 from one cell or sector to an adjacent cell or sector.

The telephony signals received by primary antenna 321 and diversity antenna 322 are frequency multiplexed together and sent via broadband network 112 to RASP 112. To accomplish this, power combiner 334 is utilized. Combiner 334 has the telephony signal output from both mixers 332a and 332b input thereto. As described in the previous paragraph these two telephony signals modulate carriers that are at different frequencies, but both frequencies are in the assigned channel of broadband distribution network 112. Power combiner 334 frequency multiplexes the two telephony signals, which are both at a carrier frequency that can be sent in the assigned channel of broadband distribution network 112 used for wireless telephone communications. These signals are input to step attenuator 336 to adjust the gain level of these frequency multiplexed signals. Similar to the operation of the previously described step attenuators, this digitally controlled attenuator is set by control signals received from remote RASP 112 as part of the gain control operation.

The frequency multiplexed telephony communication signals output from step attenuator 336 are input to signal combiner 337 which has a second input from control signal source 338. Control signal source 338 includes a local oscillator, the frequency of which is controlled by a binary signal on control leads 338a from microprocessor 210 to set the frequency of the oscillator. RASP 117 is the origin from which a control signal is received to set the frequency of local oscillator 338. As mentioned above, this operation is part of the novel dynamic re-allocation of a RAD 118, 218 from one cell or sector to an adjacent cell or sector. The frequency chosen is to fall within the band of frequencies used for the telephony communication signals received from the primary and the diversity antennas.

Responsive to different control signals received from RASP 117, microprocessor 210 (FIG. 2) sends signals on control inputs 338a. Microprocessor 210 causes control signal oscillator 338 to produce an information signal. The information signal indicates various information about RAD 218, but particularly including the settings of step attenuators 330a, 330b and 336, to RASP 117 as part of the novel gain control operation. RASP 117 uses this information to keep an updated status regarding each of the RADs 118a–i.

The output from combiner 337 now has three signals frequency multiplexed to be returned via broadband network 112 to RASP 117. The signals are the telephony communication signal received by primary antenna 321, the telephony communication signal received by diversity antenna 322, and the system information signal output from control signal source 338. This frequency multiplexed signal output from combiner 337 is input to band pass filter and amplifier 339 to amplify the signal and to remove any extraneous signals before the signal is coupled to broadband distribution network 112 and sent to RASP 117 for processing. In one application of RAD 118, handling CDMA formatted telephony signals, there is so much signal processing to be done to the CDMA formatted signals that the signals from the primary and diversity antennas 321, 322 are sent back to RASP 117 for processing, rather than do the signal processing in RAD 118.

Transformer and coupler 340 is used to couple the frequency multiplexed signal described in the last paragraph to broadband distribution network 112. The transformer is an impedance matching transformer having 50 ohm primary and 75 ohm secondary windings. When broadband distribution network 112 uses coaxial cable, the secondary winding of transformer 340 is wired in series with the center conductor of the video distribution coaxial cable. As previously described, RAD 118 hangs from the coaxial cabling of the broadband distribution network 112 to which it is connected. In other applications, such as with fiber optic cable, other well known frequency conversion and signal coupling techniques are used.

A small portion of the frequency multiplexed signals passing through transformer and coupler 340 is coupled to Built In Test (BIT) and power monitor 341. Power monitor 341 samples the signal level of the combined signal that is being input to broadband distribution network 112 and reports this information to RASP 117 via control signal source 338 which has been previously described. In the event that RASP 117 detects a drop in received signal level from a RAD 118, it sends a control signal to the particular RAD 118 which causes the previously described gain control signal 342 to be injected and gain control information to be returned. In this manner RASP 117 can determine where the signal loss is occurring. Thereafter, other control signals can be sent form RASP 117 to RAD 118 causing change to the settings of attenuators 330a&b and 336 to adjust the gain level.

Figure 4:
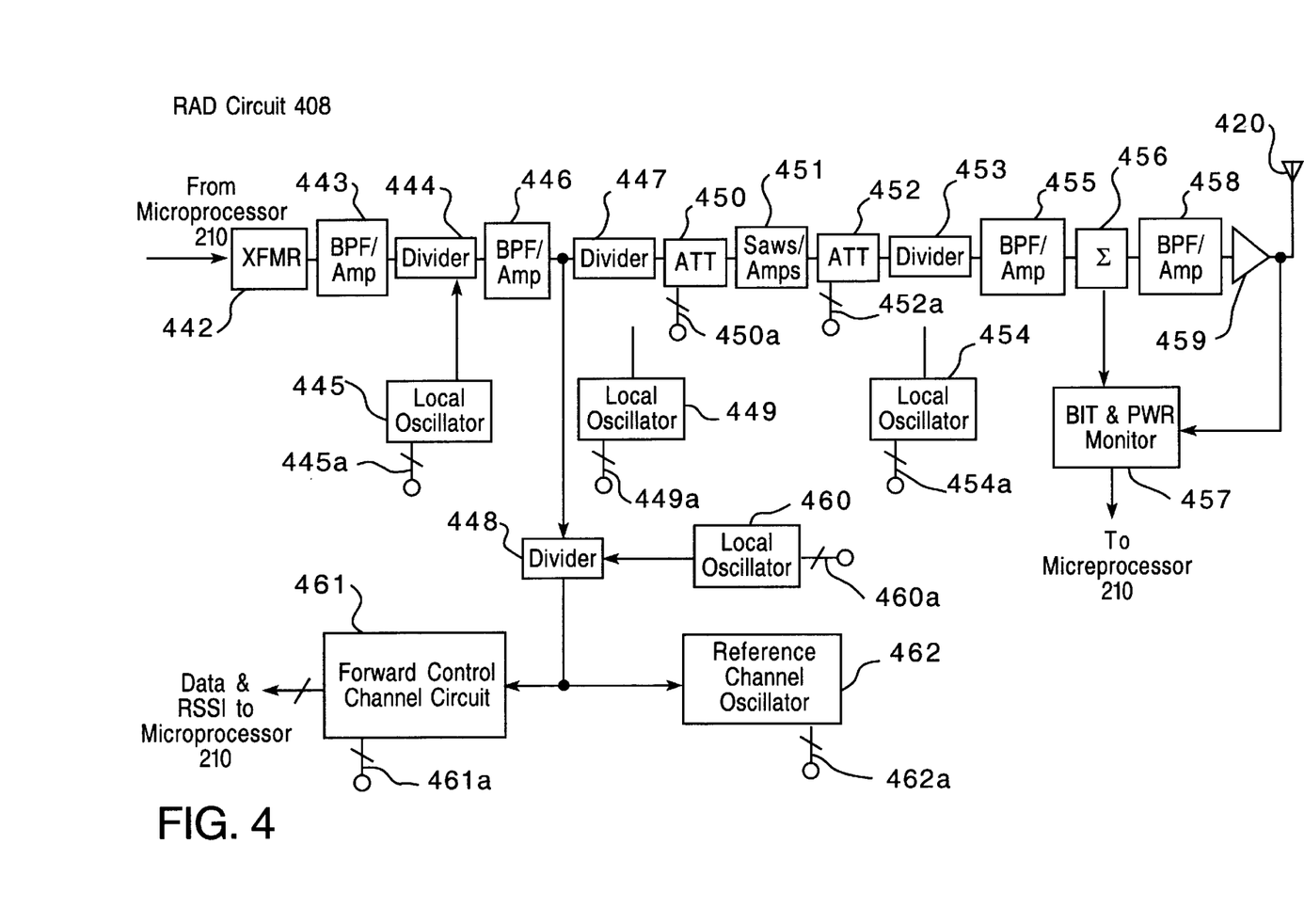
FIG. 4 is a detailed block diagram of the portion of a remote transceiver that receives telephony communication signals from wireless telephones and forwards the signals via the broadband distribution network to the central transceiver, and which can be dynamically reallocated to in accordance with the teaching of the present invention.

In FIG. 4 is shown a detailed block diagram of circuit 408 in RAD 118 that carries telephony signals originating at RASP 117 via broadband distribution network 112 and RAD 118 to wireless telephones 119 in accordance with the teaching of the present invention. As previously described, RAD 118 hangs from and is connected to broadband distribution network 112. Transformer 442 is an impedance matching transformer having 75 ohm primary and 50 ohm secondary windings. When broadband distribution network 112 is coaxial cable, the primary winding of transformer 442 is wired in series with the center conductor of the coaxial cable. Transformer 442 is used to connect frequency multiplexed communications and control signals carried on broadband distribution network 112 to the input of all RADs 118. Only the RADs 118, the receive frequency which has been tuned to the particular frequency of the signals on broadband distribution network 112 by control signals from RASP 117 actually receive and forward the telephony signals to a wireless telephone 119. As mentioned above, setting the frequency of oscillators in each RAD 118 is part of the novel dynamic re-allocation of a RAD 118, 218 from one cell or sector to an adjacent cell or sector.

All RADs assigned to a cell or sector receive control signals directed toward any one of those RADs. However, each RAD 118 has a unique address that is used by the RAD 118 so that RAD 118 only accepts control signals directed specifically to it by RASP 117.

The frequency multiplexed telephony and control signals received by RAD circuit 408 is input to band pass filter and amplifier 443. This filter passes all frequency multiplexed telephony communication and control signals that are carried in the assigned channel on broadband distribution network 112 used to carry telephony signals, and excludes all television and other signals carried on broadband distribution network 112. Circuit 443 also amplifies these signals.

The received and amplified signals are input to mixer 444 along with a signal from local oscillator 445. Alike the local oscillators shown in FIG. 2 and described with reference to that Figure, the frequency of local oscillator 445 is digitally controlled 445a by microprocessor 210 in FIG. 2 responsive to control signals microprocessor 210 receives from RASP 117. As mentioned above, this operation is part of the novel dynamic re-allocation of a RAD 118, 218 from one cell or sector to an adjacent cell or sector. In a manner well-known in the art, mixer 444 mixes the received signals and the signal from local oscillator 445 and outputs many signals which include the communication and control signals meant for this RAD 118. However the frequency of interest is now shifted downward the carrier frequency used to transmit communication signals via antenna 420 to wireless telephones.

The different frequencies output from mixer 444 are input to band pass filter and amplifier 446 which is tuned to pass and amplify only the telephony and control signals output from mixer 444 and intended for this RAD 118.

The selected set of telephony and control signals are now input to mixer 447 of a second heterodyning stage. Mixer 447 also has an input from local oscillator 449. Alike other local oscillators in FIGS. 3 and 4, oscillator 449 is digitally controlled 449a by microprocessor 210 responsive to control signals received from RASP 117. As mentioned above, this operation is part of the novel dynamic re-allocation of a RAD 118, 218 from one cell or sector to an adjacent cell or sector. In a manner well-known in the art, mixer 447 combines the signals input to it and provides a number of output signals at different frequencies. All these frequencies are input to an attenuator 450 which is used to adjust the gain level of the signals. Attenuator 450 is part of the gain control system and is digitally controlled at its input 450a in ½ dB steps by microprocessor 210 alike the digitally controlled attenuator 336 in FIG. 3.

The gain adjusted signal output from attenuator 450 is input to SAW filter and amplifier 451. SAW filter 451 has a relatively narrow bandpass and passes only the telephony communication signals at the right carrier frequency to amplifier 451 which amplifies same. Control signals frequency multiplexed with the telephony signal do not pass through SAW filter 451. Instead, the control signals are input to mixer 448 as is described further in this specification.

The telephony communication signals passed through SAW filter 451 are further shifted in frequency to have the proper carrier frequency required for transmitting the telephony signal via transmit antenna 420 to remote wireless telephones 119. The telephony signal is input to digitally controlled attenuator 452 to adjust the gain level of the signal before it is input to mixer 453 along with the output of digitally controlled local oscillator 454. Attenuator 452 is part of the end to end automatic gain control system and is digitally controlled 452a in 2 dB steps by microprocessor 210, responsive to control signals received from RASP 117, alike digitally controlled attenuators 350 and 336. Oscillator 454 is controlled by microprocessor 210, responsive to control signals received from RASP 117, in the same manner as local oscillators 445 and 449.

The amplitude adjusted telephony communication signal output from attenuator 452 is input to the third heterodyning stage which includes mixer 453 and digitally controlled oscillator 454. The frequency of operation of oscillator 454 is set by a binary control word on its control input 454a which is received from microprocessor 210 responsive to a control signal received from RASP 117. As mentioned above, this operation is part of the novel dynamic re-allocation of a RAD 118, 218 from one cell or sector to an adjacent cell or sector.

Mixer 453 combines the two signals in a manner well-known in the art to produce several output signals, one of which is the telephony signal having the desired carrier frequency for transmission of the telephony signal to a remote wireless telephone 119. The signals output from mixer 453 are input to band pass filter and amplifier 455. Band pass filter 455 passes only the desired carrier frequency. The signal is also amplified before being input to signal divider 456.

The telephony communication signal input to divider 456 is divided and a portion of the signal goes to bit and power monitor 457, while the remainder of the signal is input to band pass filter and amplifier 458. Bandpass filter 458 assures that there are no extraneous signals combined with the desired telephony communication signal, amplifies same, and applies it to power amplifier 459. Power amplifier 459 amplifies the communication signal and couples it to transmit antenna 420. The signal is transmitted within the area of the cell or sector covered by this RAD 118 and is received by a remote wireless telephone 119 which is presently connected to this RAD 118.

The portion of the telephony signal input to bit and power monitor 456 is sampled to determine the signal level of the telephony signal and carrier that is being input to bandpass filter 458 and reports this information back to RASP 117 as previously described with reference to bit and power monitor 341 in RAD circuit 309. An additional input is provided to power monitor 457 from the output of power amplifier 459. Responsive to a control signal received from RASP 117, microprocessor 210 takes the power level information obtained and causes control signal oscillator 338 to generate an output to send this information to RASP 117 via broadband distribution network 112 as previously described with reference to FIG. 3. This information is used by RASP 117 as part of the automatic gain control. In the event that RASP 117 detects a drop in the signal level at bit and power monitor 457, it can send a control signal to microprocessor 210 to adjust the gain in RAD circuit 408 by re-setting attenuators 450 and 452 as part of the gain control operation.

A portion of the first intermediate frequency output from bandpass filter and amplifier 446 is input to mixer 448 along with the output from binary controlled local oscillator 460. The frequency of operation of oscillator 460 is set by a binary control word on its control input 460a which is received from microprocessor 210 responsive to a control signal received from RASP 117. As mentioned above, this operation is part of the novel dynamic re-allocation of a RAD 118, 218 from one cell or sector to an adjacent cell or sector.

The output of mixer 448 is input to reference channel oscillator 462 and forward control channel circuit 461. Circuit 461 removes all frequency multiplexed control signals sent from RASP 117 and sends them to microprocessor 210. Control signals have a RAD address as part of the control signals and each RAD 118 has a unique address. Therefore, microprocessor 210 in each RAD 118 can recognize control signals directed to it.

When a RAD 118 receives control signals directed to it, microprocessor 210 responds thereto to perform the action required by RASP 117. The control signal may ask for the settings of the local oscillators and attenuators, and this information is returned to RASP 117 using control signal oscillator 338 as previously described. The control signal from RASP 117 may indicate revised settings for local oscillators and attenuators. Microprocessor 210 makes the required changes and then sends a confirmation signal back to RASP 117 indicating that the requested changes have been made. As part of the gain control operation the control signal from RASP 117 may also request information concerning the outputs from bit and power monitors 341 and 457, and then request that the output from gain tone oscillator 342 be added to the telephony signals. Responsive to any of these control signals, microprocessor 210 performs the requests.

Reference channel oscillator 462 processes the output of mixer 448 to generate a phase lock loop reference signal that is used to provide a master frequency to all local oscillators within all RAD 118s to match their frequency of operation with RASP 117.

While what has been described hereinabove is the preferred embodiment of the dynamic re-allocation of the RADs, it can be understood that numerous changes may be made by those skilled in the art to how the dynamic re-allocation is accomplished without departing from the scope of the invention.

What is claimed is:

1. A wireless telephone system, comprising:

a central transceiver; and first and second remote transceivers in communication with the central transceiver via a broadband distribution network for carrying telephony signals between wireless telecommunication devices and the central transceiver, wherein the first remote transceiver is for handling wireless traffic in a first defined coverage area and the second remote transceiver is for handling wireless traffic in a second defined coverage area, wherein the first and second defined coverage areas overlap, and wherein the first remote transceivers includes:

a first circuit for transmitting a telephony signal received from the central transceiver via the broadband distribution network to a mobile telecommunications device, wherein the first circuit includes a first plurality of heterodyne stages coupled between the broadband distribution network and a transmit antenna, wherein each of the first plurality heterodyne stages includes a mixer and an oscillator, each oscillator having an output frequency;

a second circuit for transmitting a telephony signal received from the mobile telecommunications device to the central transceiver via the broadband distribution network, wherein the second circuit includes a second plurality of heterodyne stages coupled between a receive antenna and the broadband distribution network, wherein each of the second plurality of heterodyne stages includes a mixer and an oscillator, each oscillator having an output frequency; and a microprocessor in communication with the central transceiver for receiving a first control signal from the central transceiver and, based thereon, for outputting a control signal to each of the oscillators of the first and second plurality of heterodyne stages to change the output frequency of the oscillators such that the first remote transceiver transmits wireless telephony signals to the mobile telecommunications device at the same frequency as the second remote transceiver transmits wireless telephony signals to the mobile telecommunications device, and such that the first remote transceiver receives wireless telephony signals from the mobile telecommunications device at the same frequency as the second remote transceiver receives wireless telephony signals from the mobile telecommunications device.

2. The wireless telephone system of claim 1, wherein the second remote transceiver includes:

a third circuit for transmitting a telephony signal received from the central transceiver via the broadband distribution network to a second mobile telecommunications device, wherein the third circuit includes a third plurality of heterodyne stages coupled between the broadband distribution network and a transmit antenna, wherein each of the third plurality heterodyne stages includes a mixer and an oscillator, each oscillator having an output frequency;

a fourth circuit for transmitting a telephony signal received from the second mobile telecommunications device to the central transceiver via the broadband distribution network, wherein the fourth circuit includes a fourth plurality of heterodyne stages coupled between a receive antenna and the broadband distribution network, wherein each of the fourth plurality of heterodyne stages includes a mixer and an oscillator, each oscillator having an output frequency; and a second microprocessor in communication with the central transceiver for receiving a second control signal from the central transceiver and, based thereon, for outputting a control signal to each of the oscillators of the third and fourth plurality of heterodyne stages to change the output frequency of the oscillators such that the second remote transceiver transmits wireless telephony signals to the second mobile telecommunications device at the same frequency as the first remote transceiver transmits wireless telephony signals to the second mobile telecommunications device, and such that the second remote transceiver receives wireless telephony signals from the second mobile telecommunications device at the same frequency as the first remote transceiver receives wireless telephony signals from the second mobile telecommunications device.

3. The wireless telephone system of claim 1, wherein the broadband distribution network includes at least one of a hybrid fiber coaxial (HFC) cable, a fiber optic cable, and a coaxial cable.

4. The wireless telephone system of claim 1, wherein the central transceiver includes a remote antenna signal processor (RASP).

5. The wireless telephone system of claim 1, wherein at least one of the first and second remote transceivers includes a remote antenna driver (RAD).

6. The wireless telephone system of claim 1, further comprising a base transceiver station in communication with the central transceiver.

7. The wireless telephone system of claim 1, wherein the second circuit of the first remote transceiver further includes:

a second receive antenna;

a second plurality of mixers coupled to the second receive antenna, wherein each mixer of the second plurality of mixers is responsive to one of the oscillators of the second plurality of heterodyne stages; and a power combiner having a first input terminal coupled to an output terminal of a mixer of the second plurality of heterodyne stages, a second input terminal coupled to an output terminal of a mixer of one of the second plurality of mixers, and an output terminal coupled to the broadband distribution network.

8. The wireless telephone system of claim 7, wherein the second circuit of the first remote transceiver further includes an additional heterodyne stage coupled between the output terminal of the power combiner and the broadband distribution network, wherein the additional heterodyne stage includes a mixer and an oscillator having an output frequency that is controlled by the microprocessor based on the first control signal.

* * * * *